US010754480B2

(12) United States Patent
Amir et al.

(10) Patent No.: US 10,754,480 B2
(45) Date of Patent: Aug. 25, 2020

(54) FRAMES FOR INTERACTIVE POSTERS

(71) Applicant: Hewlett-Packard Development Company, L.P., Houston, TX (US)

(72) Inventors: Gideon Amir, Ness Ziona (IL); Niv Shem Tov, Rishon Le Zion (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/963,794

(22) Filed: Apr. 26, 2018

(65) Prior Publication Data

US 2019/0332199 A1     Oct. 31, 2019

(51) Int. Cl.
*G06F 3/044*     (2006.01)
*G06F 3/0488*    (2013.01)

(52) U.S. Cl.
CPC ............ *G06F 3/044* (2013.01); *G06F 3/0488* (2013.01)

(58) Field of Classification Search
CPC ................................ G06F 3/044; G06F 3/0488
See application file for complete search history.

(56) References Cited

U.S. PATENT DOCUMENTS

| | | |
|---|---|---|
| 7,868,778 B2 | 1/2011 | Kenwright |
| 8,773,387 B2 | 7/2014 | Michael et al. |
| 9,425,790 B2 | 8/2016 | Stone |
| 9,489,856 B2 | 11/2016 | Herz |
| 9,513,748 B2 | 12/2016 | Rihn et al. |
| 9,671,913 B2 | 6/2017 | Heinkkinen et al. |
| 2003/0078840 A1* | 4/2003 | Strunk ............... G06Q 30/0254 705/14.52 |
| 2007/0018998 A1 | 1/2007 | Hagglund et al. |
| 2007/0195512 A1* | 8/2007 | Konno ............... H01R 13/6599 361/771 |
| 2008/0238706 A1* | 10/2008 | Kenwright ............. G06F 3/044 340/686.6 |
| 2015/0029318 A1* | 1/2015 | Cho ....................... G09F 27/005 348/77 |
| 2015/0269875 A1* | 9/2015 | Corcoran ............. G08B 25/009 40/553 |
| 2015/0381790 A1* | 12/2015 | Badeau ................. G09F 15/005 455/411 |
| 2016/0313959 A1* | 10/2016 | Abell ..................... G06F 3/1423 |
| 2017/0162972 A1* | 6/2017 | Kim ..................... H01R 12/714 |
| 2017/0250687 A1 | 8/2017 | Stone |
| 2018/0253221 A1* | 9/2018 | Cho ........................ G06F 3/017 |

* cited by examiner

*Primary Examiner* — Amare Mengistu
*Assistant Examiner* — Crystal Mathews
(74) *Attorney, Agent, or Firm* — Fabian VanCott

(57) ABSTRACT

A frame to removably retain an interactive poster can comprise an electronics module to communicate with the interactive poster.

18 Claims, 5 Drawing Sheets

FRAMES FOR INTERACTIVE POSTERS

BACKGROUND

Displays may retain posters with which a user may interact.

BRIEF DESCRIPTION OF DRAWINGS

Examples will now be described, by way of non-limiting example, with reference to the accompanying drawings, in which.

DETAILED DESCRIPTION

In some examples, interactive posters comprise their own electronics which make manufacture, and the task of replacing one poster with another, more difficult.

Figure 1:
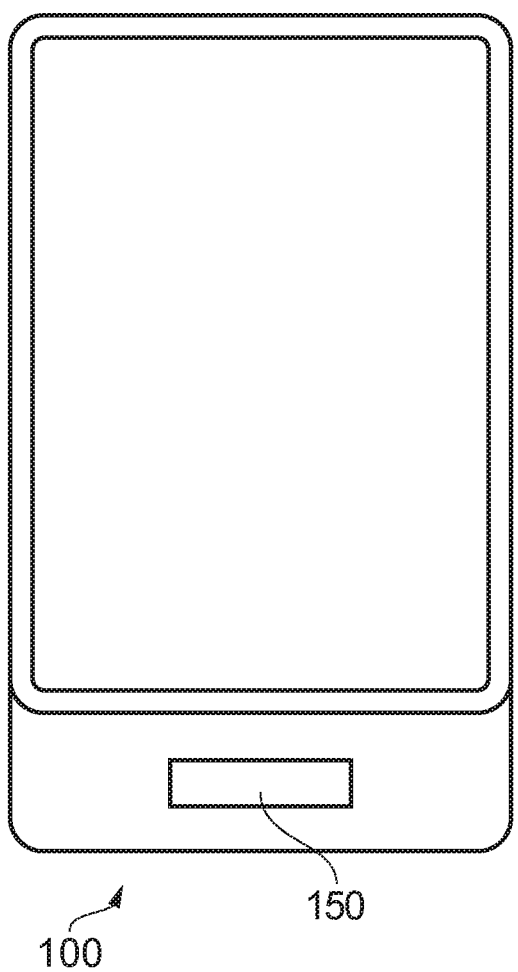
FIG. 1 is a simplified schematic representation of an example frame.

FIG. 1 shows an example frame 100 to removably retain an interactive poster. The frame 100 comprises an electronics module 110 to communicate with the interactive poster.

A poster may be removably retained within the frame 100 such that the electronics module 110 is in electrical contact, or communication, with any electronic elements provided on the interactive poster. For example the interactive poster may comprise graphics on a front-facing layer of the poster. On the back of the interactive poster, either on the opposite side of the front-facing layer or on a poster layer below the front-facing layer, a conductive marking agent or a conductive print agent (for example a conductive ink or a conductive paint) may be provided forming conductive lines from the graphics of the interactive poster. When such an interactive poster is mounted in the frame 100 the conductive lines may be in communication with the electronics module 110. For example, the conductive lines may directly connect to the electronics module HO, or the frame 100 may comprise at least one conductor to electrically connect the conductive lines of the interactive poster with the electronics module 110 for communication therebetween. Each connection can be either resistive (such that direct current flows through it) or capacitive.

The frame 100 may be utilised in conjunction with capacitive sensing. According to one example, the frame may comprise a capacitive sensor, which may be provided within the electronics module 110. A capacitive sensor may sense changes to a reference voltage resulting from user interaction with a conductive element connected to the capacitive sensor. For example, at least one conductive line on the interactive poster may be connected to the electronics module 110 and to a capacitive sensor comprised therein, and when a user is proximate enough to the interactive poster to cause an appreciable capacitance between the user and the conductive lines on the poster, the capacitive sensor may sense that resulting change and infer the presence of the user. As a result, the electronics module 110 may perform a specified function, for example play an audio file or actuate a light, e.g. an LED provided in the frame 100.

User interaction about the interactive poster may therefore cause the electronic module 110 to perform a specific function.

An interactive poster that does not comprise its own electronics, for example an electronics board attached directly to a layer of the poster, may therefore be utilised with the example frame of FIG. 1. For example, a poster may be removably retained within the frame 100 and any electronic elements of the poster, e.g. any conductive lines formed by conductive paint or ink deposited thereon, may be connected to the electronics module 110, either directly or via at least one conductor, for interactive interaction with the poster.

Figure 2:
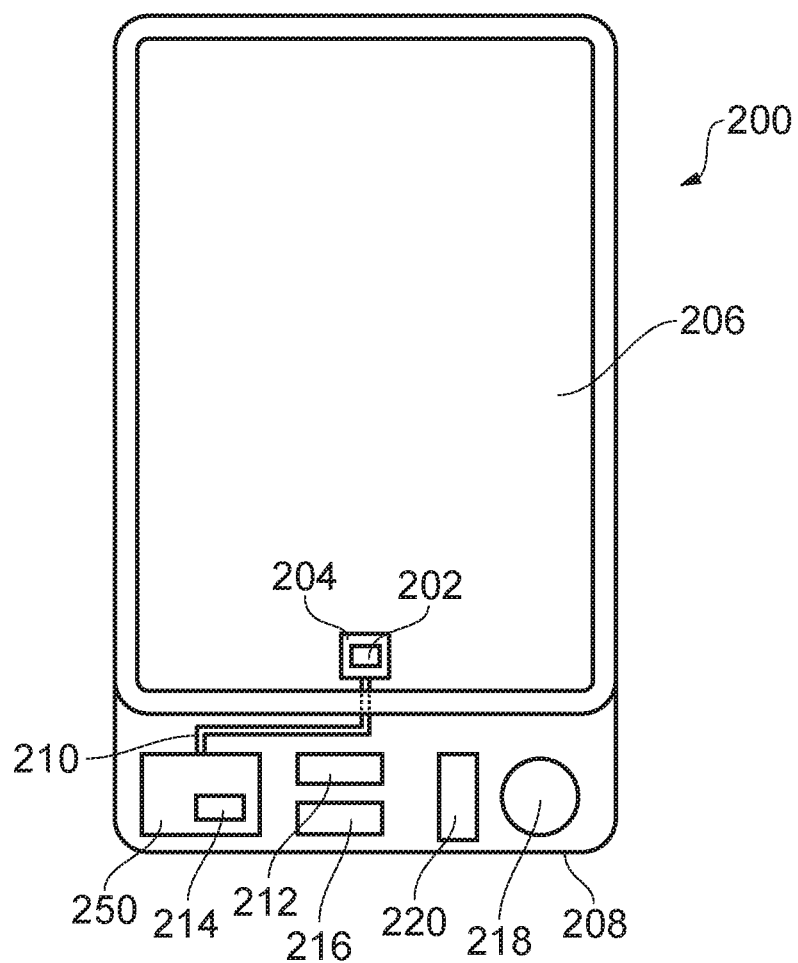
FIG. 2 is a simplified schematic representation of a further example frame.

FIG. 2 shows an example frame 200 to removably retain an interactive poster. The frame 200 comprises an electronics module 250 to communicate with the interactive poster.

The frame 200 comprises a biasing element 202. The biasing element is to bias the electronics module 250 into contact with the interactive poster. The biasing element 202 may be to bias the electronic module 250 in conducive or capacitive contact with the interactive poster. The biasing element 202 is electrically conductive. The biasing element 202 biases the interactive poster away from the frame 200. The frame 200 comprises an electrical contact 204 and the biasing element 202 is to bias the electrical contact 204 into physical contact with the interactive poster. The frame 200 comprises a conductor 210 electrically connected to the electronics module 250. The conductor 210 may be to provide a resistive or capacitive connection with the electronics module 250. The conductor 210 terminates outside the base 208 of the frame 200.

According to one example, when an interactive poster is to be installed within the frame 200, such that it is releasably retained within the frame 200, the biasing element 202 may ensure continual electrical contact between the electronics module 250 and the interactive poster. For example the biasing element 202 may be directly connected to the electronics module 250, or connected to the conductor 210 extending from the electronics module 250, and may urge the conductor 210 or the electronics module 250 into contact with the interactive poster, e.g. into contact with a conductive line on the interactive poster.

In one example, the biasing element 202 may urge the electrical contact 204 into contact with the interactive poster. For example the biasing element 202 may be to exert a pressure that forces the contact 204 in the direction of the interactive poster when mounted in the frame 200.

Any bends or deformities in the integrity of the interactive poster may therefore be compensated for since any bent or deformed poster areas may be contacted by the biasing element 202 and be biased into electrical connection between the interactive poster and the electronics module 250. For example, if part of the interactive poster comprising a conductive line were bent in such a way to deform the conductive line away from the frame 200, this part may be in contact with the biasing element 202 which may urge the electronics module 250 into contact with the conductive line, either directly or via a conductor 210 or contact 204.

In one example, the biasing element 202 is to bias the interactive poster outwardly with respect to the frame 200, or in a direction away from the frame 200. More specifically, the biasing element 202 may bias the electronics module 250, or conductor 210, or contact 204 outward with respect to frame and into contact with the interactive poster. Therefore the biasing element 202 may be to maintain electrical connection between the electronics module 250 and the interactive poster through the biasing element 202.

The frame 200 comprises a rear panel 206 and a base 208 attached to the rear panel 206. The interactive poster is supported against the rear panel when in use. The electronics module 250 is provided within the base 208 of the frame 200. The frame 200 may therefore take on the appearance of a poster or picture frame. The frame 200 may comprise an upper and lower panel and side panels framing a rear panel 206. The biasing element 202 may be to bias the interactive poster in a direction outward, or away, from the rear panel 206. In one example the biasing element 202 may bias at least one of the electronics module 250, conductor 210, and contact 204 outward from the rear panel 206.

The frame 200 comprises a proximity sensor 220, a Wi-Fi module 212, a capacitive sensor 214, an amplifier 216, and a speaker 218. At least one of the electronics module 250, proximity sensor 220, Wi-Fi module 212, capacitive sensor 214, amplifier 216 and speaker 218 may be provided within at least one of the upper, lower, and side panels of the frame 200. In one example all components may be provided in a lower panel of the frame.

The proximity sensor 220 may be an ultrasonic sensor. The proximity sensor 220 may be directly connected to the electronics module 250. The proximity sensor 220 may be to interact with a user approaching or touching the frame. According to one example, in one example the proximity sensor 220 is to trigger a function of the electronics module 250 in response to sensing that a user is less than a predetermined distance from the interactive poster. In one example, a user touching the poster may trigger the electronics module 250 to play an audio file stored thereon.

The amplifier 216 may be operably connected to the speaker 218 which may be to playback any audio files stored on the electronics module 250.

The Wi-Fi module 212 may be connected to the electronics module 250. The electronics module 250 may house a CPU for the frame 200. The Wi-Fi module 212 may, in use of the frame 200, update files stored within the electronics module 250. For example, the frame 200 may be to connect, via the W-Fi module 212, to the internet and may, in use download files, e.g. updates or audio files, to the electronics control module 212. Any functions of the electronics control module 250 that may be triggered by user interaction with the interactive poster, therefore be periodically updated. According to one example the electronics module 250 may be to replace content thereon via the Wi-Fi module 212. The frame 200 may be to interact with a smart device, e.g. a smart phone or smart lamp equipped with Wi-Fi communication.

In one example user interaction with the interactive poster, e.g. touching or being in close proximity thereto, may cause the Wi-Fi module 212 to interact with another device, e.g. an external device such as the user's smart device. According to one example, user interaction with the interactive poster may cause the frame 200 to interact with the user's smart device.

At least one speaker may be provided in the frame 200 and one amplifier may be provided for each speaker.

In use, an interactive poster may be releasably retained within the frame 200 such that any conductive lines, e.g. formed by a conductive marking agent or a conductive print agent (for example a conductive ink or a conductive paint), of the poster are connected to the electronics module 250, either directly or indirectly, e.g. via at least one of conductor 210 and a contact 204. When a user is proximate the interactive poster, for example proximate enough the conductive lines of the interactive poster the capacitive sensor 214 may sense the resulting change in voltage and may actuate the frame 200, e.g. any components housed within the base 208 of the frame 200, to perform a specific function.

At least one of the electronics module 250, proximity sensor 220, a Wi-Fi module 212, a capacitive sensor 214, an amplifier 216, and a speaker 218 may be housed in the rear panel 206 of the frame 200. According to one example the electronic components of the frame 200 may be housed in a back panel of the frame 200 and therefore behind a poster when supported in the frame.

At least one of the proximity sensor 220, a Wi-Fi module 212, a capacitive sensor 214, an amplifier 216, and a speaker 218 may be connected to the electronics module 250. User interaction may trigger the electronics module 250 to actuate at least one of the one of the proximity sensor 220, a Wi-Fi module 212, a capacitive sensor 214, an amplifier 216, and a speaker 218.

In this example, the conductor 210 terminates outside of the frame 200. The conductor 210 may comprise a wider portion to contact the interactive poster. The conductor 210 may terminate in the wider portion. If the interactive poster comprises conductive lines with terminal points the wider portion of the conductor 210 may allow for a greater freedom of alignment to ensure a physical (in one example, resistive; in another example, capacitive) connection between the terminal points of the conductor 210 and the conductive line of the interactive poster. The conductor 210 may comprise the contact 204. The contact 204 may be the wider portion of the conductor 210. The biasing element 202 may be provided about the wider portion of the conductor 210. The biasing element 202 may urge the interactive poster outward with respect to the frame 200, the urging being toward a user and not toward any component of the frame 200. Additionally, as the conductor 210 may terminate outside the frame 200, contact with the interactive poster may be made at either a central portion of the poster or a periphery of the poster.

According to one example, at least one of the contact 204 and the biasing element 202 may be provided outside the frame 200. The conductor 210 may extend from the biasing element 202 outside the frame and enter the frame 200 where it may connect to the electronics module 250.

Figure 3:
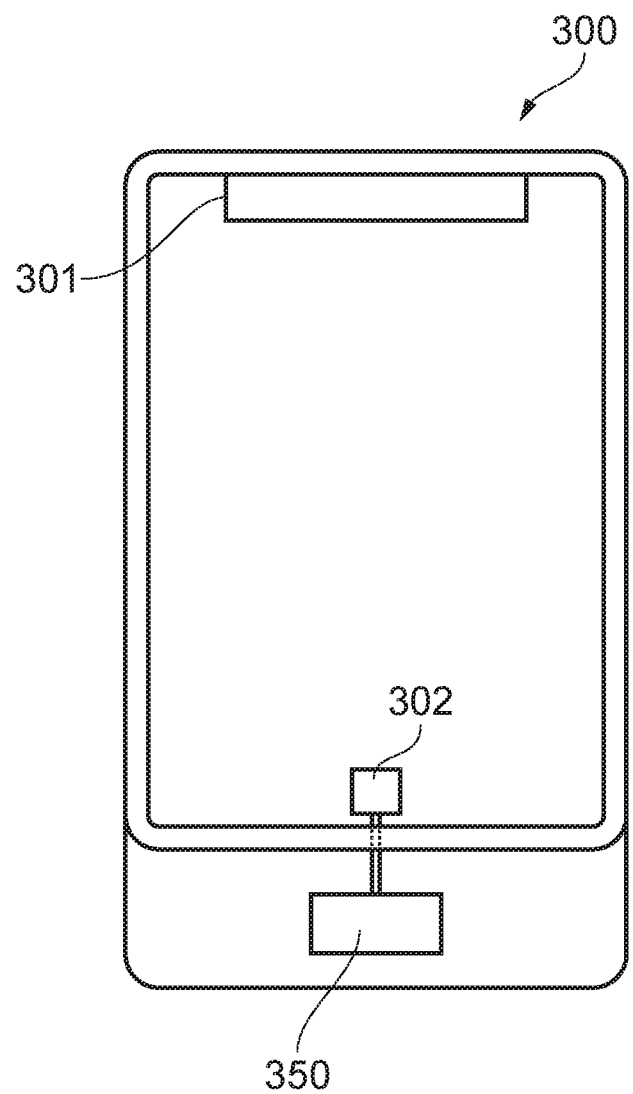
FIG. 3 is a simplified schematic representation of an example interactive display.

FIG. 3 shows an example interactive display 300. The interactive display 300 comprises an electronics module 350, a retaining member 301 to removably retain an interactive poster within the interactive display. The interactive display 300 comprises a biasing element 302 to bias the electronics module 350 into contact with the interactive poster.

The retaining member 301 may be part of the interactive display 300. For example, the retaining member 301 may be integral with the interactive display 300. The retaining member 301 may comprise a clip to removable retain the interactive poster. In one example the retaining member 301 may comprise at least part of a frame, for example a border of a frame to surround the interactive poster.

The interactive display comprises a biasing element 302 which may bias the interactive poster away from the interactive display, thereby ensuring continual contact between the electronics module 350 and the interactive poster, including bent or deformed parts thereof. The biasing element 302 may be to bias a conductor connected to the electronics module 350 into contact with the interactive poster, or to bias an electrical contact into contact with the interactive poster. For example, the biasing element 302 may be to bias at least one of the electronics module 350, a conductor and an electrical contact into contact with a conductive line of the interactive poster formed by a deposition of a conductive marking agent or a conductive print agent, for example a conductive ink or paint.

Figure 4:
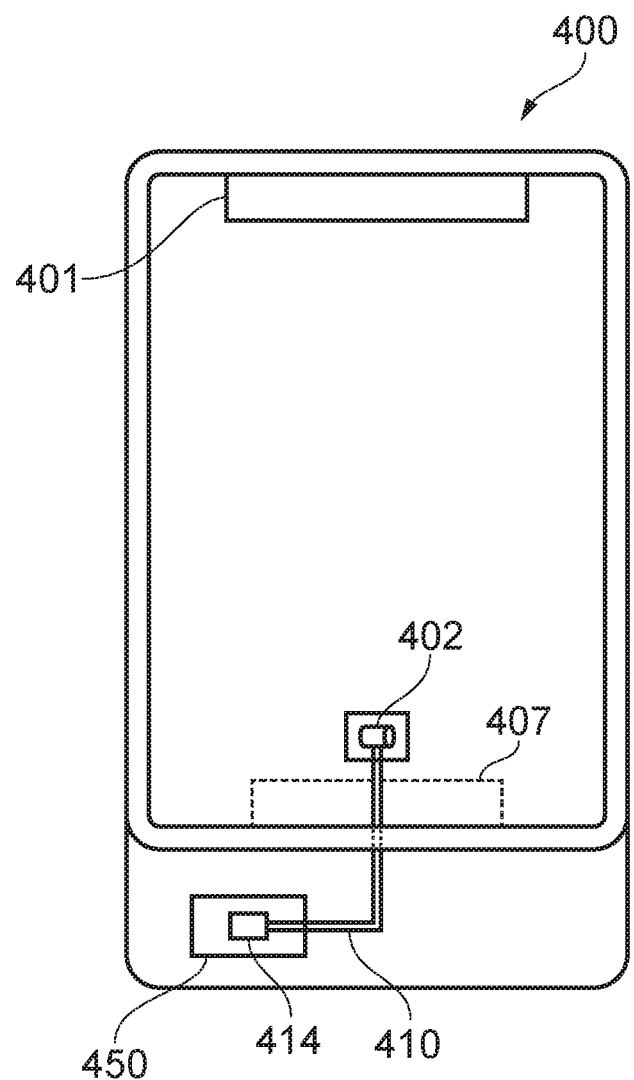
FIG. 4 is a simplified schematic representation of a further example interactive display.

FIG. 4 shows an example interactive display 400. The interactive display 400 comprises an electronics module 450, a retaining member 401 to removably retain an interactive poster within the interactive display. The interactive display 400 comprises a biasing element 402 to bias the electronics module into contact with the interactive poster.

The electronics module 450 comprises a capacitive sensor 414 and a conductor 410 to electrically connect the capacitive sensor 414 to the interactive poster. The conductor 410 may electrically connect, either by a resistive or a capacitive connection, the capacitive sensor 414 to the interactive poster.

The biasing element 402 is to bias the conductor 410 into contact with the interactive poster. The biasing element 402 is a conductive spring. The biasing element 402 may be to bias the conductor 410 into conductive contact or capacitive contact with the interactive poster.

The interactive display 400 further comprises a shield 407 to prevent physical contact between at least a portion of the conductor 410 and the interactive poster. The shield 407 may be flexible. The shield 407 may be transparent. In one example the shield 407 may comprise a clear plastic film.

The biasing element 402 may be to bias the conductor 410 into contact with the interactive poster. For example the biasing element 402 may be to exert a force that urges the conductor 410 into contact with conductive lines of the interactive poster. The biasing element 402 may comprise the conductor 410.

As the biasing element 402 is a conductive spring the biasing element 402 may be connected to the conductor 410 and may bias itself into contact with the interactive poster. In such an example, a change in capacitance resulting from a user's touch and sensed by the capacitive sensor 414, may be conveyed from the interactive poster and to the electronics module 450 via the biasing element 402. Therefore, in one example the biasing element 402 may act as a conductive interface between conductive portions of the interactive poster and the interactive display 400. Therefore, in one example the biasing element 402 is biased into contact with a conductive line of the interactive poster and is electrically connected to the electronics module 450.

The biasing element 402 may be any spring such as a circular, or coil, spring.

Figure 5:
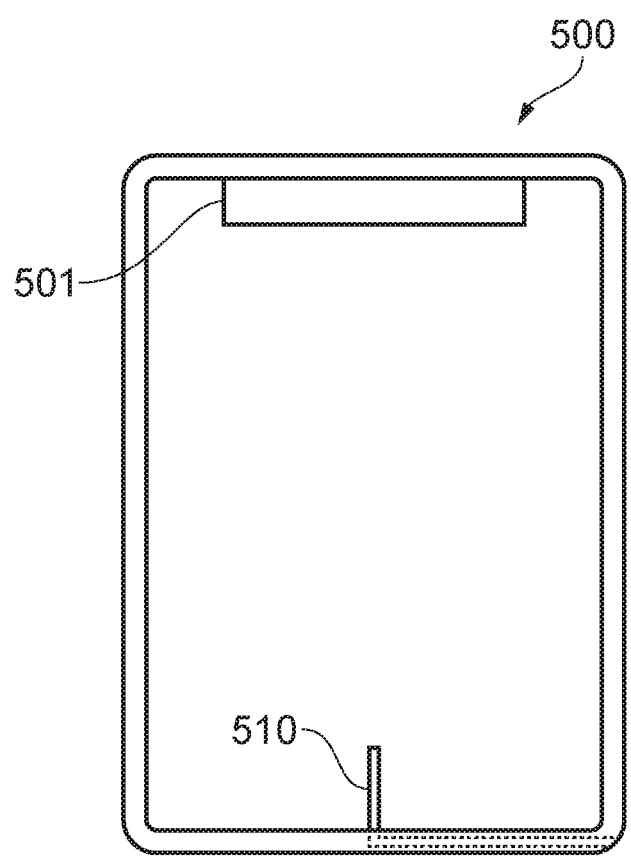
FIG. 5 is a simplified schematic representation of an example poster display device.

FIG. 5 shows an example poster display device 500. The poster display device 500 comprises a retaining member 501 to releasably retain a poster within the poster display device 500, and a conductor 510 to connect the poster to an electronic control unit.

Contact between the poster and the electronic control unit may be resistive or capacitive. Accordingly, the conductor 510 may be to electrically connect (via a resistive or capacitive connection) the poster to an electronic control unit.

The electronics control unit may be external to the poster display device 500 or may be provided within the poster display device 500. In one example the poster display device 500 comprises a poster housing, e.g. a frame, and the electronic control unit is housed within the frame.

The retaining member 501 may comprise a frame and the poster may be releasably retained within the poster display device 500 by being mounted in the frame. In such an example the electronic control unit may be provided within the frame.

The conductor may be biased into contact with the poster. The conductor may comprise an attachment point to contact the poster. The attachment point may be biased into contact with the poster. The poster display device 500 may comprise a biasing element for biasing the attachment point into contact with the poster. The biasing element may be in contact with the attachment point. The attachment point may be, or may be provided on, a terminal end of the conductor. The attachment point may have a wider area than that of the conductor. The biasing element may be conductive.

In some examples the electronics module, or electronic control unit, may comprise a touch board.

In other examples a poster, for example an interactive poster, may comprise at least one (e.g. a plurality) of graphic interfaces with at least one conductive line associated therewith. In such examples at least one conductor may be provided, with each conductor being connected, e.g. electrically and/or physically connected, with each conductive line on the poster. At least one biasing element may also be provided, each biasing element may be to bias each conductor into contact with each conductive line on the poster.

In use, examples presented herein may provide a housing for a poster, such as a user-interactable poster. A retaining mechanism may releasably, or removably retain, the poster such that interactive posters may be retainable within the poster housing (e.g. a frame, poster display device, or interactive device). The poster may comprise a plurality of conductive elements, for example a plurality of conductive lines connected, at one end, to a graphical element of the poster and, at another end, to an attachment area. In use, the poster may be retained at or about the poster housing such that the attachment areas of the poster connect to attachment points of the housing. Accordingly, the housing may comprise an electronic unit (e.g. an electronics module) from which a plurality of conductors extend through the housing and terminate outside the housing at an attachment point, or contact. Each contact may therefore be connected to an attachment area of the conductive lines of the poster when the poster is retained within the housing. A plurality of biasing elements may be provided such that each attachment point is biased into contact with an attachment area of the poster. Additional components such as a W-Fi unit, proximity sensor, amplifier, and speaker may be provided. In use, when a proximity sensor senses the presence of a user an electronic unit may activate to issue a signal, for example, a warning light. When the user interacts with the poster, for example by touching or coming into close proximity to a graphical element of the poster, a capacitive sensor may actuate the electronics control module to actuate a Wi-Fi unit to communicate with the user's smart phone, or actuate the amplifier and speaker to play an audio file stored within the electronics unit.

While the apparatuses and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the abovementioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A frame to removably retain an interactive poster, the frame comprising:
   an electronics module to communicate with the interactive poster;
   an electrical contact in communication with the electronic module; and
   a biasing element;
   wherein the electrical contact is disposed and supported on the biasing element, the biasing element biasing the electrical contact into contact with an interactive poster when an interactive poster is disposed in the frame, wherein the biasing element is electrically conductive and provides a signal path between the electrical contact and the electronics module.

2. A frame according to claim 1 wherein the biasing element to bias the electronics module into capacitive contact with the interactive poster.

3. A frame according to claim 1 wherein the biasing element is to bias the interactive poster toward a viewer of the poster and away from the frame.

4. A frame according to claim 1 wherein the biasing element is to bias the electrical contact into physical and conductive contact with the interactive poster.

5. A frame according to claim 1 wherein the frame comprises a rear panel and a base attached to the rear panel, wherein the interactive poster is supported against the rear panel when in use, and wherein the electronics module is provided within the base of the frame.

6. A frame according to claim 5 further comprising a conductor electrically connected to the electronics module, wherein the conductor terminates outside the base of the frame.

7. A frame according to claim 1 wherein the electronics module comprises a Wi-Fi module.

8. A frame according to claim 7 the WiFi module to communicate with a smart device of a user interacting with the interactive poster.

9. A frame according to claim 7 the WiFi module to download data to the electronic module that is used to respond to user interaction with the interactive poster.

10. A frame according to claim 1 further comprising a Light Emitting Diode (LED) incorporated into the frame, the electronics module operating the LED in response to user interaction with the interactive poster as detecting through the electrical contact.

11. A frame according to claim 1 further comprising an ultrasonic proximity sensor.

12. A frame according to claim 1 further comprising a transparent shield to prevent contact between the interactive poster and a portion of the electrically conductive biasing element providing a signal path between the electronics module and the electrical contact.

13. An interactive display comprising:
    an electronics module;
    a retaining member to removably retain an interactive poster within the interactive display;
    a biasing element to bias an electrical contact of the electronics module into contact with the interactive poster, the electric contact also biases the interactive poster outward with respect to the retaining member and toward a viewer of the interactive poster, wherein the biasing element is electrically conductive and provides a signal path between the electrical contact and the electronics module; and
    a Wi-Fi module to communicate with a smart device of a user interacting with the interactive poster and to download data to the electronic module that is used to respond to user interaction with the interactive poster.

14. An interactive display according to claim 13 wherein the electronics module comprises a capacitive sensor and a conductor to electrically connect the capacitive sensor to the interactive poster.

15. An interactive display according to claim 13 further comprising an ultrasonic proximity sensor.

16. An interactive display according to claim 13 wherein the biasing element is a conductive spring.

17. An interactive display according to claim 13 further comprising a transparent shield to prevent physical contact between the interactive poster and at least a portion of a conductor to connect the electronics module with an electrical contact in contact with the interactive poster.

18. A poster display device comprising:
    a retaining member to releasably retain a poster within the poster display device;
    a conductor to connect the poster to an electronic control unit; and
    a transparent shield to prevent physical contact between the poster and at least a portion of the conductor connecting the electronic control unit with an electrical contact in electrical contact with the poster; and
    a biasing element to bias the electrical contact into electrical contact with the poster, wherein the biasing element comprises the conductor which is electrically conductive and provides a signal path between the electrical contact and the electronic control unit.

* * * * *